United States Patent
Hsia et al.

(10) Patent No.: US 9,288,867 B2
(45) Date of Patent: Mar. 15, 2016

(54) LINEAR SOLID-STATE LIGHTING WITH A WIDE RANGE OF INPUT VOLTAGE AND FREQUENCY FREE OF FIRE AND SHOCK HAZARDS

(71) Applicant: Lightel Technologies, Inc., Renton, WA (US)

(72) Inventors: Chungho Hsia, Bellevue, WA (US); Pai-Sheng Shen, Bellevue, WA (US)

(73) Assignee: Lightel Technologies, Inc., Renton, WA (US)

( * ) Notice: Subject to any disclaimer, the term of this patent is extended or adjusted under 35 U.S.C. 154(b) by 0 days.

(21) Appl. No.: 14/688,841

(22) Filed: Apr. 16, 2015

(65) Prior Publication Data

US 2015/0223303 A1   Aug. 6, 2015

Related U.S. Application Data

(63) Continuation-in-part of application No. 14/465,174, filed on Aug. 21, 2014, and a continuation-in-part of application No. 14/135,116, filed on Dec. 19, 2013, now Pat. No. 9,163,818, and a continuation-in-part of application No. 13/525,249, filed on Jun. 15, 2012, now Pat. No. 8,749,167.

(51) Int. Cl.
| | |
|---|---|
| *H05B 33/08* | (2006.01) |
| *F21K 99/00* | (2010.01) |
| *F21V 25/04* | (2006.01) |
| *H02M 3/00* | (2006.01) |
| *H02M 1/32* | (2007.01) |
| *F21Y 101/02* | (2006.01) |
| *H02M 1/00* | (2007.01) |

(52) U.S. Cl.
CPC ............ *H05B 33/0884* (2013.01); *F21K 9/175* (2013.01); *F21V 25/04* (2013.01); *H02M 1/32* (2013.01); *H02M 3/00* (2013.01); *H05B 33/0803* (2013.01); *H05B 33/0806* (2013.01); *H05B 33/0815* (2013.01); *H05B 33/0845* (2013.01); *F21Y 2101/02* (2013.01); *H02M 2001/0058* (2013.01); *Y02B 20/341* (2013.01); *Y02B 20/347* (2013.01)

(58) Field of Classification Search
USPC ............ 315/121, 201, 205, 209 R, 212, 219, 315/291, 297, 307
See application file for complete search history.

(56) References Cited

U.S. PATENT DOCUMENTS

| | | | | |
|---|---|---|---|---|
| 7,898,237 | B2 * | 3/2011 | Shao | H02M 1/4225 323/207 |
| 8,525,501 | B2 * | 9/2013 | Hsieh | G05F 1/70 323/283 |

(Continued)

*Primary Examiner* — Douglas W Owens
*Assistant Examiner* — James H Cho
(74) *Attorney, Agent, or Firm* — Han IP Corporation

(57) ABSTRACT

A linear light-emitting diode (LED)-based solid-state universal lamp using an all-in-one LED driving circuit with a power factor correction (PFC) and control device operates normally for a regulated power and current from either electronic ballast or AC mains. The all-in-one LED driving circuit is configured to operate in a wide range of input voltages and frequencies, especially for various high voltages and high frequencies associated with various electronic ballasts. With a cycle-by-cycle current control and power switching at a constant on-time and varied off-time, an over-rated surge current is limited, preventing occasional fire hazards occurred in the ballast. When two shock protection switches are used in two lamp bases in the lamp, the universal lamp fully protects a person from possible electric shock during initial installation and re-lamping.

20 Claims, 6 Drawing Sheets

(56) References Cited

U.S. PATENT DOCUMENTS 9,112,426 B2 * 8/2015 Zhu .................... H02M 1/4258
2014/0028211 A1 * 1/2014 Imam ................ H02M 3/33507
                                                          315/200 R

* cited by examiner

LINEAR SOLID-STATE LIGHTING WITH A WIDE RANGE OF INPUT VOLTAGE AND FREQUENCY FREE OF FIRE AND SHOCK HAZARDS

CROSS-REFERENCE TO RELATED APPLICATIONS

This application is a continuation-in-part (CIP) application of U.S. patent application Ser. No. 14/465,174, filed Aug. 21, 2014 and currently pending, which is a CIP application of U.S. patent application Ser. No. 14/135,116, filed Dec. 19, 2013 and currently pending, which is a CIP application of U.S. patent application Ser. No. 13/525,249, filed Jun. 15, 2012 and issued as U.S. Pat. No. 8,749,167 on Jun. 10, 2014. The above-identified applications are incorporated herein by reference in its entirety.

BACKGROUND

1. Technical Field

The present disclosure relates to linear light-emitting diode (LED) lamps that work with linear tube lamp fixtures configured to electrically connect either electronic ballast or the AC mains, and more particularly to a universal, shock and fire hazard-free linear LED tube lamp with a shock-protection mechanism.

2. Description of the Related Art

Solid-state lighting from semiconductor light-emitting diodes (LEDs) has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit application of a linear LED tube (LLT) lamp to replace an existing fluorescent tube, consumers may choose either to adopt a ballast-compatible LLT lamp with an existing ballast used to operate the fluorescent tube or to employ an AC mains-operable LED lamp by removing/bypassing the ballast. Either application has its advantages and disadvantages. In the former case, although the ballast consumes extra power, it is straightforward to replace the fluorescent tube without rewiring, which consumers have a first impression that it is the best alternative to fluorescent tube lamps. But the fact is that total cost of ownership for this approach is high regardless of very low initial cost. For example, the ballast-compatible LLT lamps work only with particular types of ballasts. If the existing ballast is not compatible with the ballast-compatible LLT lamp, the consumer will have to replace the ballast. Some facilities built long time ago incorporate different types of fixtures, which requires extensive labor for both identifying ballasts and replacing incompatible ones. Moreover, a ballast-compatible LLT lamp can operate longer than the ballast. When an old ballast fails, a new ballast will be needed to replace in order to keep the ballast-compatible LLT lamps working. Maintenance will be complicated, sometimes for lamps and sometimes for ballasts. The incurred cost will preponderate over the initial cost savings by changeover to the ballast-compatible LLT lamps for hundreds of fixtures throughout a facility. When the ballast in a fixture dies, all the ballast-compatible tube lamps in the fixture go out until the ballast is replaced. In addition, replacing a failed ballast requires a certified electrician. The labor costs and long-term maintenance costs will be unacceptable to end users. From energy saving point of view, a ballast constantly draws power, even when the ballast-compatible LLT lamps are dead or not installed. In this sense, any energy saved while using the ballast-compatible LLT becomes meaningless with the constant energy use by the ballast. In the long run, ballast-compatible LLT lamps are more expensive and less efficient than self-sustaining AC mains-operable LLT lamps.

On the contrary, an AC mains-operable LLT lamp does not require a ballast to operate. Before use of an AC mains-operable LLT lamp, the ballast in a fixture must be removed or bypassed. Removing or bypassing the ballast does not require an electrician and can be replaced by end users. Each AC mains-operable LLT lamp is self-sustaining. If one AC mains-operable tube lamp in a fixture goes out, other lamps in the fixture are not affected. Once installed, the AC mains-operable LLT lamps will only need to be replaced after 50,000 hours. In view of above advantages and disadvantages of both ballast-compatible LLT lamps and AC mains-operable LLT lamps, it seems that market needs a most cost-effectively solution by using a universal LLT lamp that can be used with the AC mains and is compatible with an electronic ballast so that LLT lamp users can save an initial cost by changeover to such a universal LLT lamp followed by retrofitting the lamp fixture to be used with the AC mains when the ballast dies.

Electronic ballasts have several different types. However in the US, instant-start electronic ballasts are most popular in lamp fixtures because they are more efficient and less expensive than other types of electronic ballasts and have few wires for installation. Nevertheless, it is better for the ballast-compatible LLT lamp to be compatible with either instant-start or rapid-start electronic ballasts. In the context hereafter, the instant-start electronic ballast will be referred to when a ballast is mentioned unless a rapid-start electronic ballast is explicitly stated.

As mentioned above, a cost-effective solution may be to use a ballast as part of an LED driver to operate a tube lamp. In some prior art schemes, a switching mode power supply (SMPS) type LED driver is proposed to use with a ballast, but has not been completely accepted due to occasional fires that arise inside the ballast. The cause of these fires has been identified to be a large dc input capacitor in the SMPS type LED driver, which may destroy a capacitor in the ballast due to excessive initial resonant voltage. A conventional SMPS type LED driver for AC mains comprises a Buck converter, which can efficiently convert input voltages of 110~277 VAC into a DC voltage required to power LEDs in a linear tube lamp. However, the ballast has an output voltage much higher than 277 VAC with a frequency well above 60 Hz. Such a Buck converter is controlled by a control logic, which has several drawbacks that limit its use in ballast applications. First, the control logic has a low operating voltage range which inherently limits the wide range of input voltages that can be used. Second, an over-voltage protection (OVP) function in the control logic starts at a low voltage limited by the low operating voltage. When an input voltage from an electronic ballast exceeds certain value, OVP functions to stop operation, shutting down the lamp. Third, the Buck converter operates in a continuous conduction mode, in which an input current fails to follow the input voltage, leading to a low power factor with AC mains and turn-on or other operational failures with the ballast. Fourth, the control logic is solely powered by a voltage built up by an input capacitor with a small capacitance to meet a short start-up requirement. When the input voltage drops to the minimum operating voltage level, the control logic fails to operate and sends no signals to the switch, and the Buck converter stops to function until the input voltage level recovers, rendering flicker. For a linear tube lamp operating solely with an electronic ballast, the power and current control is basically via an impedance or output voltage control. In the former case, when input frequency changes, the impedance changes, altering an AC current to flow into the driving circuit. A ballast, in practice, is supposed to operate two to four lamps, and its output frequency of the ballast decreases as a load increases, meaning that the total power consumption does not linearly increase as the number of lamps used increases. In the worst case, an LED tube lamp that is designed for a group of three or four lamps in a fixture powered by a ballast may be burned out due to over-rated current flowing into the LED arrays in the lamp if it is installed alone in the fixture. For the output voltage control approach, it may work with an electronic ballast but cannot be used in AC mains. In general, conventional LED drivers fail to work with a ballast and to properly operate an LED tube lamp at a regulated power, resulting in unstable lighting output. It goes without saying that the same LED drivers can operate an LED tube lamp with the AC mains. It is therefore the purpose of this invention to disclose an approach that can be adopted to operate the LED lamp with input voltages either from the AC mains or a ballast and with an LED current regulated in both cases.

In the U.S. patent application Ser. No. 14/465,174, filed Aug. 21, 2014, two double shock protection switches and a frequency sensing and control mechanism are adopted in an LLT lamp such that AC power from either an electronic ballast or AC mains can operate the lamp without operational uncertainty and electric shock hazards. In other words, no matter what a lamp fixture is configured as AC mains or an electronic ballast compatible fashion, the LLT lamp automatically detects configurations and works for either one. However, the frequency sensing and control mechanism used in the LLT lamp needs additional sensing and control devices, of which reliability may be compromised. Furthermore, when an AC voltage from a ballast is supplied to the LED driving circuit in the LLT lamp, the frequency sensing and control mechanism directs a DC current rectified from the AC voltage output of the ballast to an output capacitor without regulation, which may yield an undesirable output power. In that case, once the LED arrays in the LLT lamp are not in place as a load to dissipate the energy stored in the output capacitor, the voltage across it may exceed its rating and burn it resulting in an internal fire in the LED driving circuit.

All the LLT lamps, no matter whether AC mains-operable or ballast compatible, have one construction issue related to product safety and needed to be resolved prior to wide field deployment. This kind of LLT lamps always fails a safety test, which measures through lamp leakage current. Because a high AC voltage applies to both opposite ends of the tube when connected to a power source, the measurement of current leakage from one end to the other consistently results in a substantial current flow, which may present a risk of shock during re-lamping. Due to this potential shock risk to the person who replaces LLT lamps in an existing fluorescent tube fixture, Underwriters Laboratories (UL) uses its standard, UL 935, Risk of Shock During Relamping (Through Lamp), to do a current leakage test and to determine if LLT lamps operating with AC mains meet the consumer safety requirement. In fact, when a high AC voltage from a ballast applies to LLT lamps, the same electric shock hazard exists. Experimental results show a person's skin may be burned due to such an electric shock. In this disclosure, all of these issues will be well addressed.

SUMMARY

A universal linear LED tube (LLT) lamp comprising a housing having two ends; an LED printed circuit board (PCB) with a plurality of LEDs connected as LED arrays; a lens; a bridge rectifier having two inputs connecting to one of two pins of a bi-pin at each end of the lamp; an all-in-one LED driving circuit; and two input modules each comprising a shock protection switch, is used to replace a fluorescent tube in a retrofit or newly-made linear tube lamp fixture that could have an existing electronic ballast or simply an AC mains-ready configuration. When such a universal LLT lamp is installed in the fixture, the all-in-one LED driving circuit can detect how high an input voltage and frequency and make proper and necessary management so that the universal LLT lamp can operate with the existing electronic ballast or simply with the AC mains without operational uncertainty. When such a configuration in the all-in-one LED driving circuit is used with shock protection switches on both ends of the universal LLT lamp, the shock protection switches can effectively block an electric current flowing through the all-in-one LED driving circuit to an exposed bi-pin not yet installed in the fixture sockets, no matter whether the current is from the AC mains or a ballast. Experimental results show that ballast output voltage and current can burn a person's skin, creating an electric shock hazard as the AC mains. With shock protection switches on both ends of the universal LLT lamp, no line voltage or leakage current from the ballast will possibly appear at the exposed bi-pin during initial installation or re-lamping, thus completely eliminating risks of electric shocks.

The all-in-one LED driving circuit comprises an input filter, a power factor correction (PFC) and control device, a Buck converter in communicating with the PFC and control device, an output capacitor in parallel with a resistor connected to the Buck converter to build up an output voltage and to power the LED arrays, and a voltage feedback module extracting partial energy from the output voltage to sustain the PFC and control device. The Buck converter comprises a switch controlled by the PFC and control device, a current sensing resistor, a diode, and an inductor with its current charging and discharging controlled by the switch. The PFC and control device detects zero current in the inductor within an AC cycle of an input voltage generating a zero current detection signal and controls the switch on and off with a constant on-time and a varied off-time controlled by the zero current detection signal. By adapting switching frequencies for a high frequency associated with a ballast and a low frequency associated with the AC mains, the all-in-one LED driving circuit can provide an accurate output LED current required to operate the LED arrays no matter what input voltage is high ballast output voltage or regular 110 or 277 VAC from the AC mains. Not like prior art schemes that use an AC impedance control working only for ballast, the all-in-one LED driving circuit adopts a switching mode power supply with regulated output power and current rather than through the AC impedance control. The same switching mode power supply used in the all-in-one LED driving circuit to work with the ballast can also apply to a LLT lamp in operating with the AC mains.

Because double shock protection switches are used in both ends of the lamp, consumers can safely install such a universal LLT lamp in an existing lamp fixture used to operate a conventional fluorescent tube without operational uncertainty and electric shock hazards, no matter how the fixture is wired, double-ended AC mains or electronic ballast. The universal LLT lamp can immediately be used with an existing electronic ballast in a fixture without rewiring. When the ballast dies, consumers may choose to replace it with a new one at cost or just to bypass it and to electrically connect the fixture as an AC mains-operable one. In the latter case, the consumers can just install the universal LLT lamp back into the fixture without worrying about possible electric shock hazard that may occur when they accidentally touch an exposed bi-pin on the other end of the lamp, or possible fire hazard due to a large dc capacitor used or an unregulated current flow in a conventional LED driving circuit.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF VARIOUS EMBODIMENTS

Figure 1:
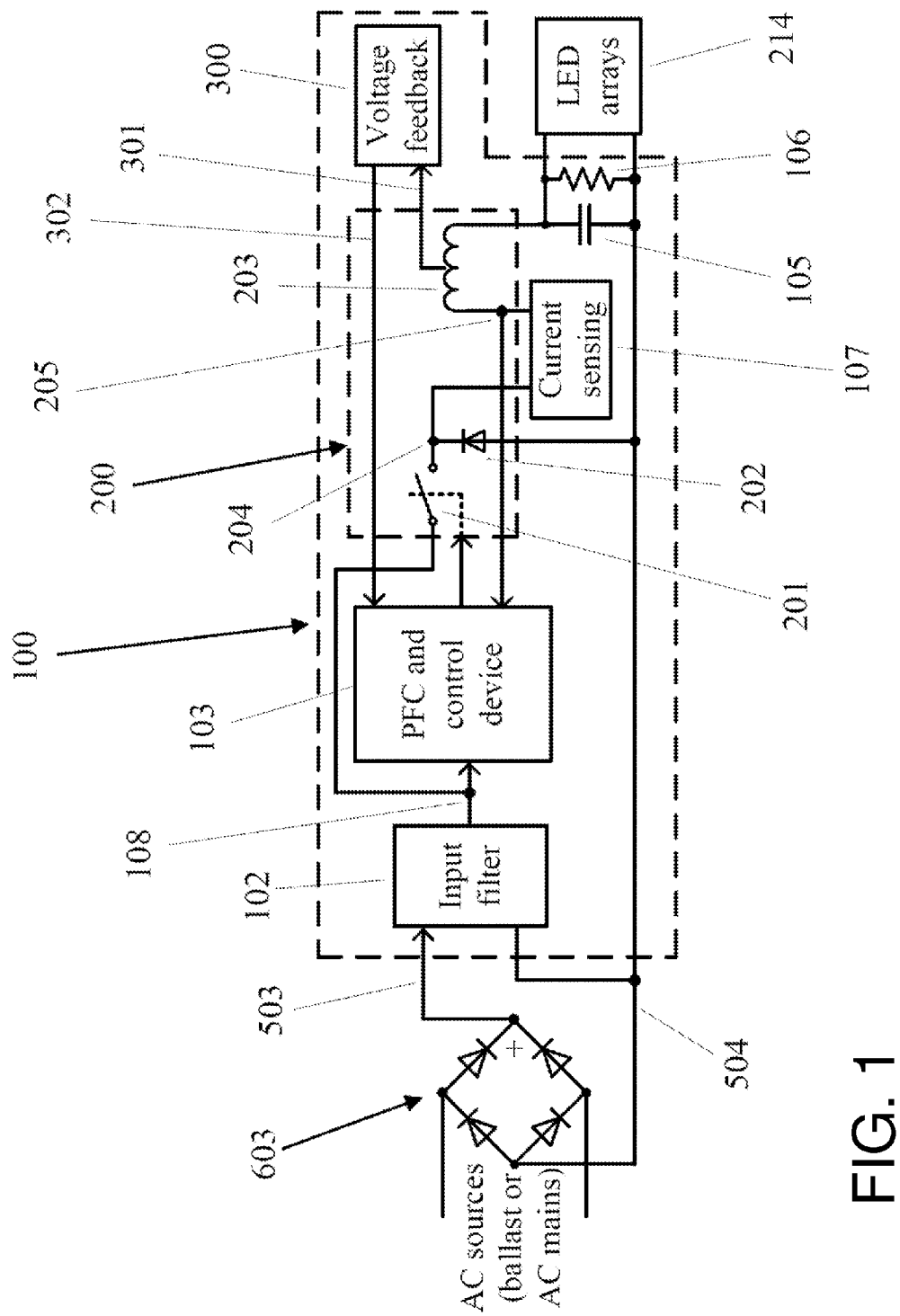
FIG. 1 is a block diagram of an all-in-one LED driving circuit used in a universal LLT lamp operable with either the AC mains or an electronic ballast according to the present disclosure.

FIG. 1 is a block diagram of an all-in-one LED driving circuit used in a universal LLT lamp operable with either the AC mains or an electronic ballast according to the present disclosure. A bridge rectifier 603 connecting to an AC source, either the AC mains or an electronic ballast, converts alternating current (AC) into direct current (DC). The all-in-one driving circuit 100 connecting to the bridge rectifier 603 comprises an input filter 102 used to filter the input voltage and to suppress EMI noise created in the all-in-one driving circuit 100, a power factor correction (PFC) and control device 103, a Buck converter 200 in communicating with the PFC and control device 103, an output capacitor 105 in parallel with a resistor 106 connected to the Buck converter 200 to build up an output voltage and to power the LED arrays 214, a current sensing resistor 107, and a voltage feedback module 300 extracting partial energy from the output voltage to sustain the PFC and control device 103. The bridge rectifier 603 has four input/output ports, among which a high electric potential appears at the input/output port 503, and a low electric potential appears at the input/output port 504 respectively connecting to the high side and the low side of the input filter 102 with the low electric potential port 504 as a common ground. The Buck converter 200 comprises a switch 201 controlled by the PFC and control device 103, a diode 202, and an inductor 203 with its current charging and discharging controlled by the switch 201. The PFC and control device 103 detects zero current in the inductor 203 within an AC cycle of an input voltage generating a zero current detection signal and controls the switch 201 on and off with a constant on-time and a varied off-time controlled by the zero current detection signal. By adapting switching frequencies for a high frequency associated with a ballast and a low frequency associated with the AC mains, the PFC and control device 103 controls the switch 201 on and off in a way that the inductor 203 is charged during on-time and discharged during off-time, and that a desired output voltage $V_o$ across the LED arrays 214 is reached to light up the LED arrays 214. The average inductor current is thus equal to the output current that flows into the LED array 214. When the switch 201 is on, the diode 202 is reverse-biased, and an input current flows from an output port 108 in the input filter 102, the switch 201, the first port 204 of the current sensing resistor 107, the current sensing resistor 107 itself, and the second port 205 of the current sensing resistor 107, into the inductor 203. When the current flowing into the inductor 203 increases, the voltage across the current sensing resistor 107 increases. The second port 205 of the current sensing resistor 107 connects with the PFC and control device 103, which continuously receives signals and adjusts the off-time such that the output voltage and current to the LED arrays 214 are regulated to meet the output requirements. The output capacitor 105 in parallel with the resistor 106 connects to the inductor 203, receiving energy to build up an output voltage and to power the LED arrays 214.

The inductor 203 configured as an autotransformer has a center-tapped port connecting to the first port 301 of the voltage feedback module 300 comprising a diode. The voltage feedback module 300 has two connection ports 301 and 302, with the first connection port 301 connecting to the center-tapped port of center-tapped inductor 203 and with the second connection port 302 connecting to the PFC and control device 103. The PFC and control device 103 has an input capacitor (not shown) with a voltage built up to supply an internal logic control circuit (not shown) in the PFC and control device 103 When the voltage decreases due to its increased internal operations and controls, and when the voltage at the center-tapped port of the inductor 203 is higher than the supplying voltage, the diode in the voltage feedback module 300 conducts to supply a current to the PFC and control device 103 and sustain its operations. The function of the voltage feedback module 300 is essential because the all-in-one LED driving circuit 100 has a wide range of operating voltages not only 110 and 277 VAC for AC mains but also 375~400 VAC for an electronic ballast. In the PFC and control device 103, a start-up resistor (not shown) is so designed to operate a LLT lamp at the lowest input voltage 110 VAC. When the highest voltage 400 VAC from the electronic ballast comes in, a higher proportional voltage appears at an input of the internal logic control circuit. Therefore an operating voltage for the internal logic control circuit must be in a wide range such as 11~35 VDC rather than 5~15 VDC as in a conventional logic control device. To meet requirements of start-up time and current without turn-on failure or flickering occurred at the lamp start-up, the input capacitor in the PFC and control device 103 with a minimum capacitance is designed and used at the input of the internal logic control circuit. The voltage feedback module 300 is thus needed to pump in energy in time and to sustain the operating voltage and ensure no flickering occurred when operating the LLT lamp.

When the switch 201 is off, the diode 202 is forward-biased, and the inductor 203 discharges with a loop current flowing from the LED arrays 214, the diode 202, the current sensing resistor 107, back to the inductor 203. The current sensing resistor 107 keeps track of the output current and feedbacks to the PFC and control device 103 to further control the switch 201 on and off. The closed loop operation in both on-time and off-time of the switch 201 ensures the output current to be accurately controlled within 4%.

Figure 2:
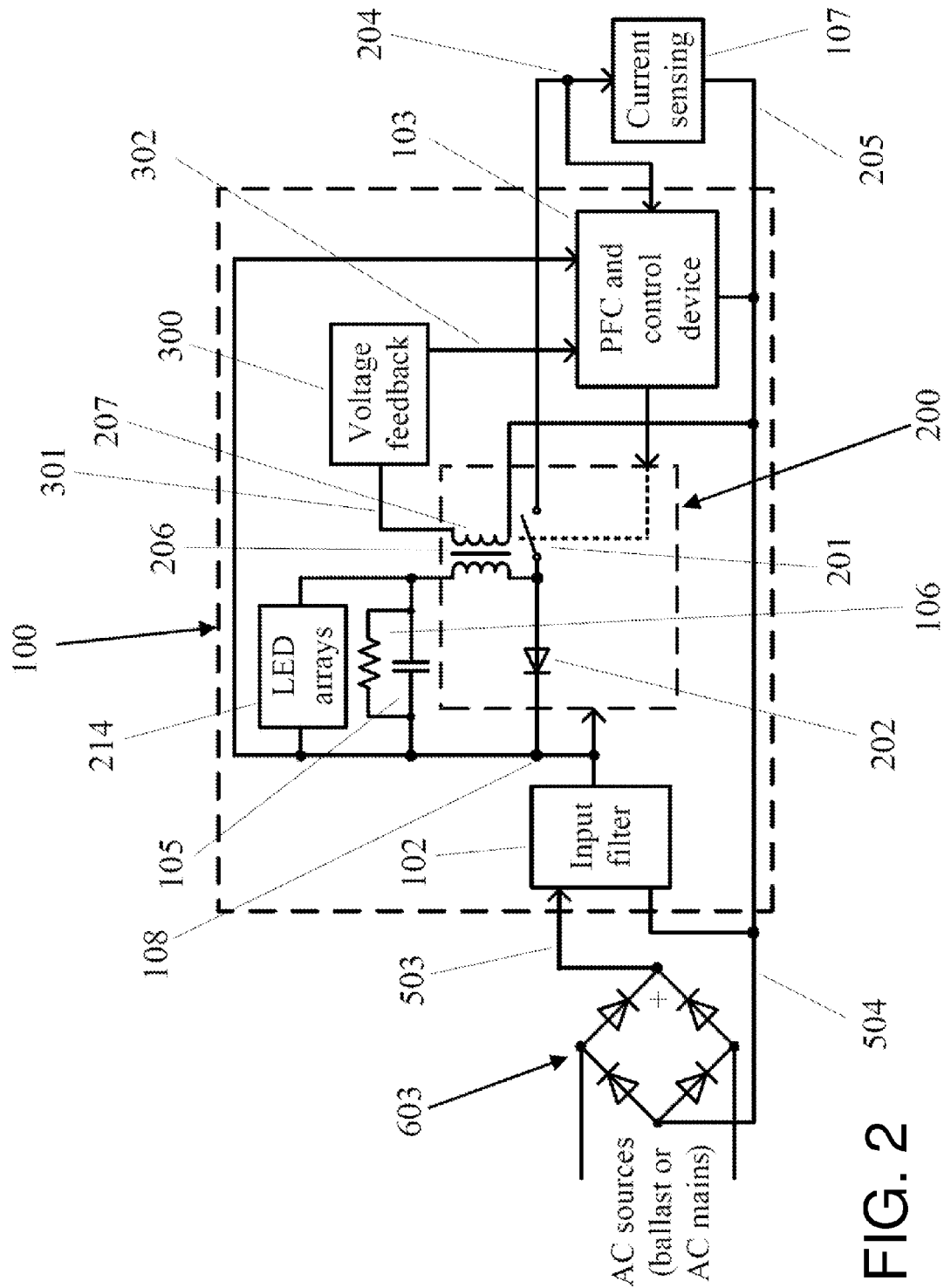
FIG. 2 is a block diagram of another embodiment of an all-in-one LED driving circuit used in universal LLT lamp operable with either the AC mains or an electronic ballast according to the present disclosure.

FIG. 2 is a block diagram of another embodiment of an all-in-one LED driving circuit used in a universal LLT lamp operable with either the AC mains or an electronic ballast according to the present disclosure. FIG. 2 has all the components as in FIG. 1, except that interconnections are different, and a transformer 206 in FIG. 2 replaces the center-tapped inductor 203 in FIG. 1. In FIG. 2, the same numerals are used for the same components as in FIG. 1. In FIG. 2, when the power is on, an input current enters the input filter 102 and then the PFC and control device 103, turning on the switch 201. Whereas the diode 202 is reverse-biased, the input current goes from the resistor 106, a primary side of the transformer 206, the switch 201, and the current sensing resistor 107 to the common ground 504, completing an AC cycle. When the input current goes into the primary side of the transformer 206, energy is stored in it. The PFC and control device 103 detects the input voltage level and control the switch 201 on and off in a way that a desired output voltage $V_o$ across the LED arrays 214 is reached to light up the LED arrays 214. When the switch 201 is off, the diode 202 is forward-biased, and the primary side of the transformer 206 releases the energy stored, resulting in a loop current flowing from the diode 202 and the LED arrays 214, back to the primary side of the transformer 206, completing the energy transfer to the LED arrays 214. When the switch 201 is on, the input current flows into the LED arrays 214, the primary side of the transformer 206, the switch 201, and the current sensing resistor 107, creating a voltage drop across the current sensing resistor 107. The voltage appearing at the port 204 of the current sensing resistor 107 inputs to the PFC and control device 103 to control the off-time of the switch 201. The voltage feedback module 300 has two connection ports 301 and 302, with the first connection port 301 connecting to a high side of a secondary winding 207 in the transformer 206 and with the second connection port 302 connecting to the PFC and control device 103, as in FIG. 1. The voltage feedback module 300 continuously monitors the output voltage by using the secondary winding 207 in the transformer 206. When the voltage at the high side of the secondary winding 207 is higher than a becoming lower operating voltage in the PFC and control device 103 due to increased internal operations, the diode (not shown) in the voltage feedback module 300 conducts to supply energy in time through the second connection port 302 to sustain the operating voltage in the PFC and control device 103.

Figure 3:
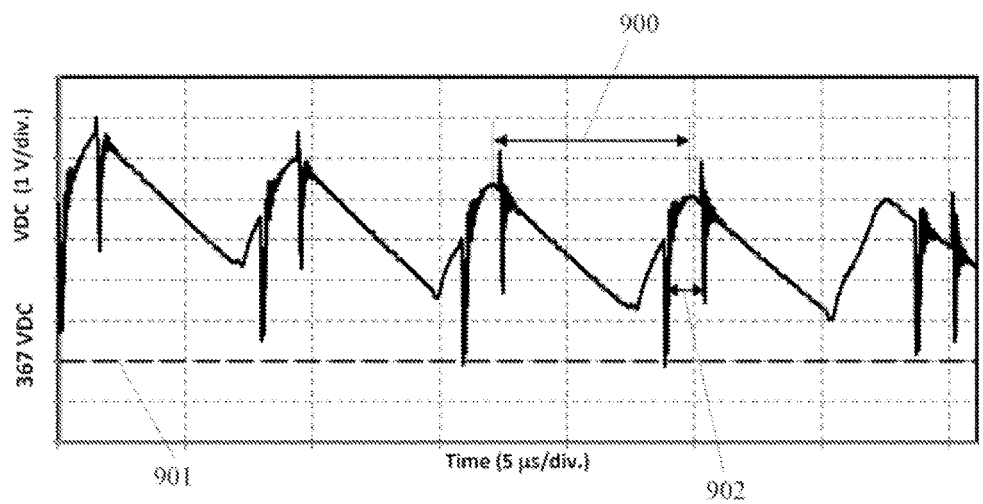
FIG. 3 is a waveform of DC voltage measured at output of a bridge rectifier used in a universal LLT lamp powered by an electronic ballast according to the present disclosure.

FIG. 3 is a waveform of DC voltage measured at output of a bridge rectifier used in a universal LLT lamp powered by an electronic ballast according to the embodiment in FIG. 1. When an electronic ballast connects to a universal LLT lamp with power, it supplies a high voltage over 350 VAC and a frequency in a range of 40~64 KHz, depending on ballast designs. Referring to FIGS. 1 and 3, the bridge rectifier 603 is used to convert AC into DC to power the all-in-one LED driving circuit 100. The bridge rectifier 603 connects to the input filter 102 used to filter out the input voltage and suppress EMI voltage generated in power switching in the all-in-one LED driving circuit 100. In FIG. 3, the DC voltage is 370V (rms) relative to a 367 VDC level at 901 with a ripple cycle 900 repeated every 7.8 μs showing a frequency of 128 KHz, twice the output frequency of the electronic ballast used. The glitches in the waveform show the EMI noise when the switch 201 is turned on and off with an on-time 903 of 1.5 μs, adapted in the PFC and control device 103. Such a short on-time is so chosen by the PFC and control device 103 because the ballast output voltage is high, and the energy the inductor is charged within the on-time is sufficiently enough to power the LED arrays 214 in each AC cycle.

Figure 4:
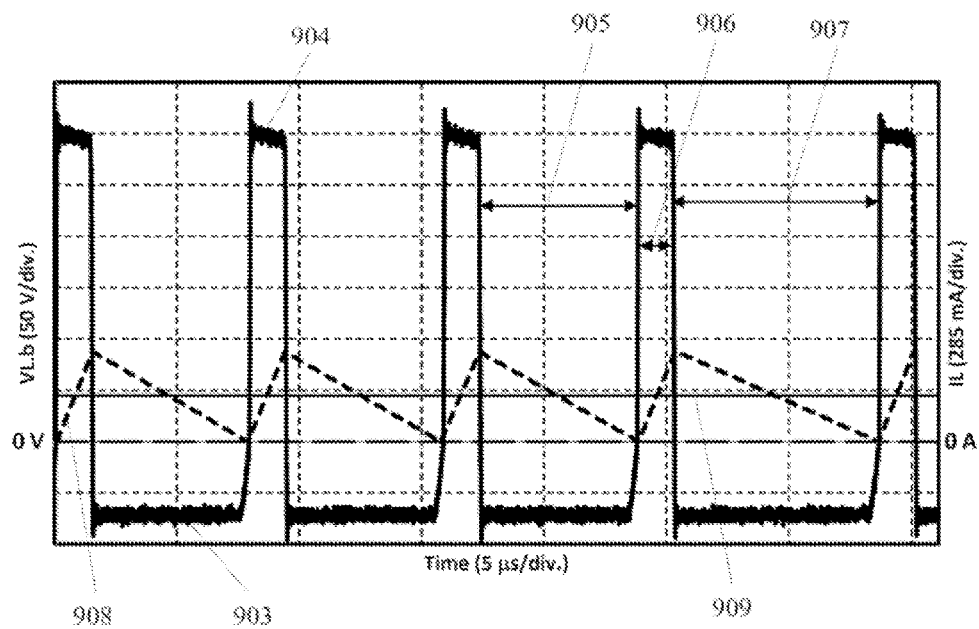
FIG. 4 is a waveform of a voltage measured across an inductor used in an all-in-one LED driving circuit when an electronic ballast is used to operate a universal LLT lamp according to the present disclosure.

FIG. 4 is a waveform of a voltage measured across an inductor used in an all-in-one LED driving circuit when an electronic ballast is used to operate a universal LLT lamp according to the present disclosure. Referring to FIGS. 1 and 4, the inductor 203 is charged when the switch 201 is on. The high level at 904 represents $V_{DC,b} - V_o$, where $V_{DC,b}$ is a voltage output from the switch 201 when the all-in-one LED driving circuit is powered by the electronic ballast, and $V_o$ is a desired output voltage across the LED arrays 214. The $V_{DC,b}$ is over 370 V (rms). The low level at 903 represents $-V_o$. The voltage $V_{L,b}$ across the inductor 203 shows a series of pulses with a pulse width 906 of 1.5 μs, same as measured in FIG. 3, representing the on-time of the switch 201. The inductor 203 is discharged when the switch 201 is off. As seen in FIG. 4, an inductor current 908 increases linearly with the on-time from the zero current, reaching the maximum $I_{pk}$ at the end of the on-time, then starting to discharge from the maximum inductor current $I_{pk}$ during off-time. At the end of the discharging cycle, the inductor current decreases to zero, and the PFC and control device 103 detects the zero current and turns on the switch 201 for a next charging cycle. An average inductor current 909 then represents a desired output current to operate the LED arrays 241. For a $V_{DC,b}$ of 370 V rectified from an electronic ballast to going into the all-in-one LED driving circuit 100, the on-time is fixed at 1.5 μs, whereas the off-time of the switch 201 varies as determined by the zero inductor current. In FIG. 4, two off-time periods 905 and 907, respectively representing 6.34 μs and 8.41 μs appear in the series of pulses. Thus the corresponding switching frequencies are 128 KHz and 101 KHz. This means that only one inductor charging cycle is available for each half cycle of the ballast AC input. The switching frequency of 128 KHz dominates in most cycles, which gives an output voltage $V_o$ based on a duty cycle of 0.191 with a constant output current h. Because the LED arrays 214 can clamp the output voltage to a stacked forward voltage determined by a plurality of LEDs connected in series, the constant (regulated) current gives a regulated power to operate the LED arrays 214 when the electronic ballast is used with the all-in-one LED driving circuit 100.

Figure 5:
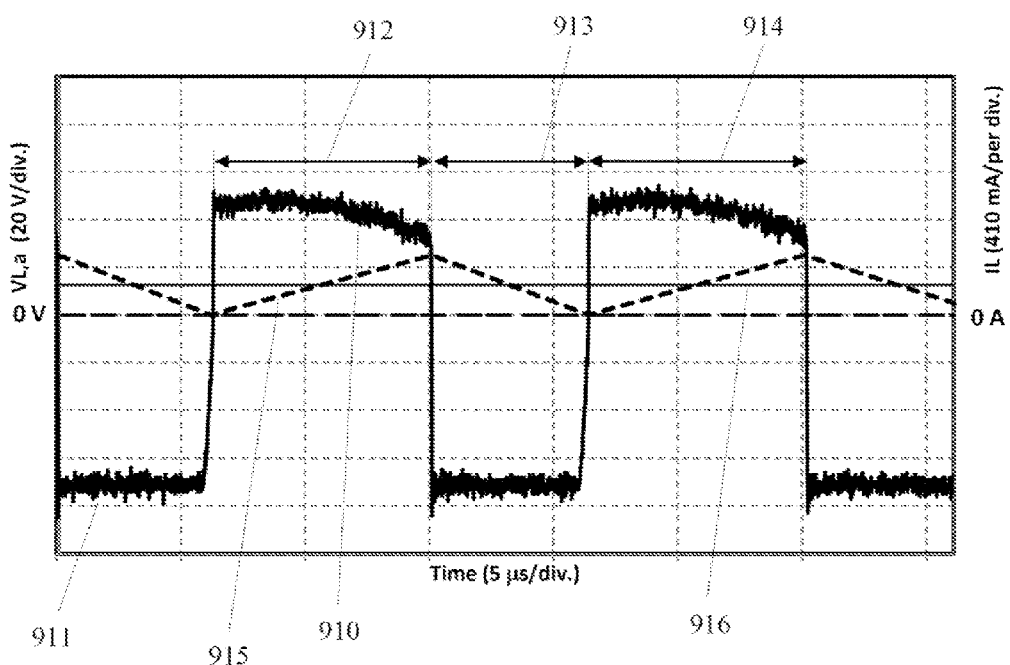
FIG. 5 is a waveform of a voltage measured across an inductor used in an all-in-one LED driving circuit when the AC mains is used to operate a universal LLT lamp according to the present disclosure.

Referring to FIG. 1, when 120 V/60 Hz of the AC mains is applied to a universal LLT, the bridge rectifier 603 outputs a DC voltage of 158 V (pk) with a ripple cycle of 8.33 ms equivalent to a frequency of 120 Hz, twice the frequency of the AC mains. FIG. 5 is a waveform of a voltage measured across an inductor used in an all-in-one LED driving circuit 100 when 120 V of AC mains is used to operate a universal LLT lamp according to the present disclosure. Referring to FIGS. 1 and 5, the inductor 203 is charged when the switch 201 is on. The high level at 910 represents $V_{DC,a} - V_o$, where $V_{DC,a}$ is a voltage output from the switch 201 when the all-in-one LED driving circuit 100 is powered by 120 V AC mains, and $V_o$ is a desired voltage across the LED arrays 214. The low level 911 represents $-V_o$. The voltage $V_{L,a}$ function of time across the inductor 203 shows two pulses with both of their pulse widths 912 and 914 of 8.66 μs, representing the on-time of the switch 201 under 120 V AC mains input. The inductor 203 is discharged when the switch 201 is off. As seen in FIG. 5, an inductor current 915 increases linearly with the on-time from the zero current when charged, reaching the maximum $I_{pk}$ at the end of the on-time, then starting to discharge from the maximum inductor current $I_{pk}$ during off-time. At the end of discharge cycle, the inductor current decreases to zero, and the PFC and control device 103 detects the zero current and turns on the switch 201 for a next charging cycle. An average inductor current 916 then represents a desired output current to operate the LED arrays 241. For a VDC of 158 V rectified from the 120 V AC mains to going into the all-in-one LED driving circuit 100, the on-time is fixed at 8.66 μs, whereas the off-time of the switch 201 varies as determined by the zero inductor current. In FIG. 5, the off-time period 913 of 6.22 μs appears in between the two pulses. Thus the corresponding switching frequency is 67 KHz. This means that hundreds of inductor charging cycles are used for each half cycle of the 120 V AC mains input. However, the switching frequencies vary from 55 KHz to 67 KHz for each half cycle of the 120 V AC mains input because $V_{DC,a}$ has a sinusoidal dependency, and the off-time varies accordingly. In FIG. 5, a duty cycle of 0.582 gives a desired output voltage $V_o$ with a constant output current, yielding a regulated power to operate the LED arrays 214 when the AC mains are used with the all-in-one LED driving circuit 100. For a 277 VAC/60 Hz input, experimental results are similar to the ones depicted above for 110 VAC input with a switch on-time and off-time of 2 μs and 8~9.5 μs, respectively, which is equivalent to a switching frequency of 90~103 KHz.

Figure 6:
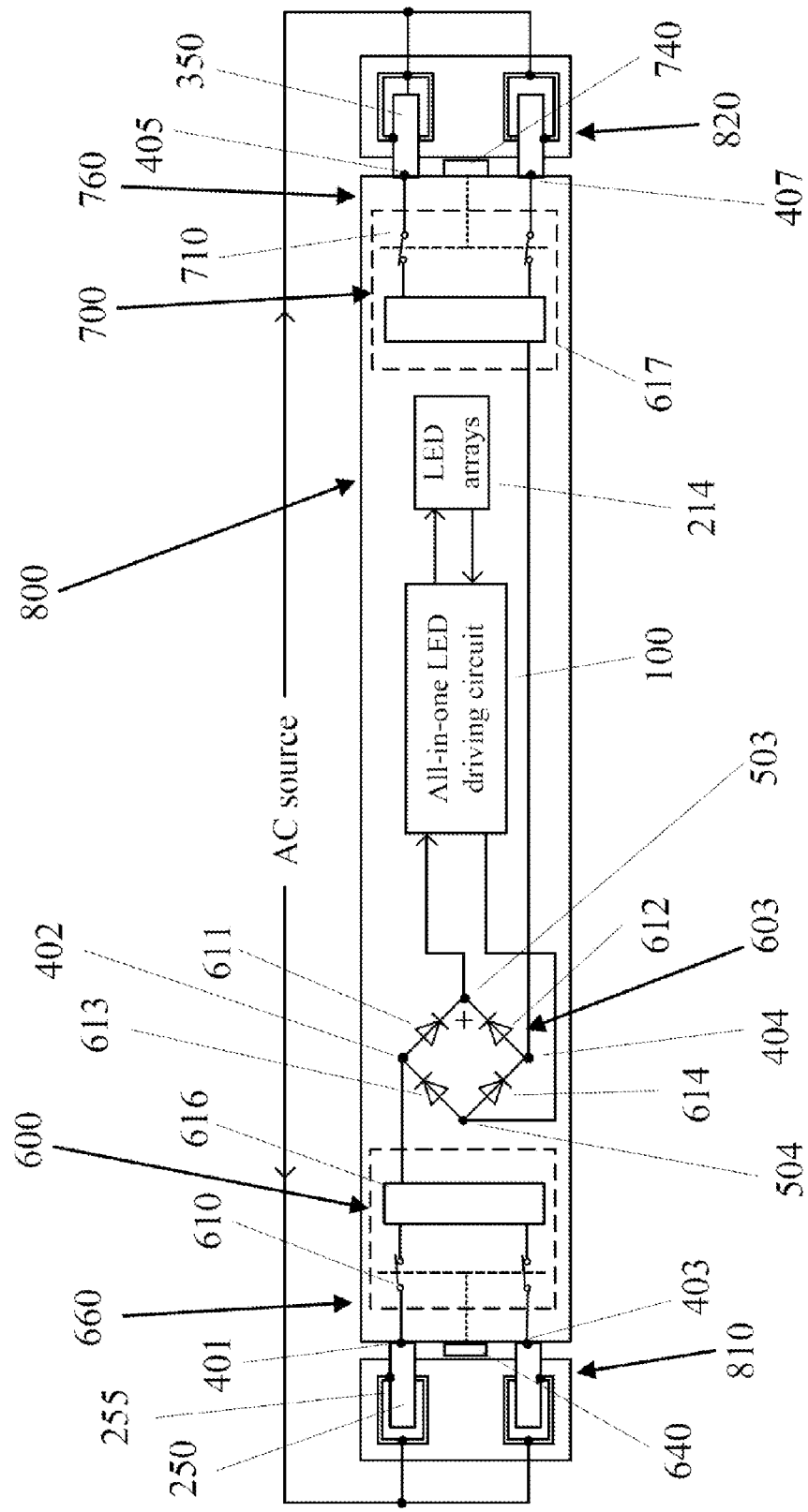
FIG. 6 is a block diagram of a universal LLT lamp operable with an instant-start electronic ballast or the AC mains according to the present disclosure.

FIG. 6 is a block diagram of a universal LLT lamp operable with an AC source, either an instant-start electronic ballast or the AC mains according to the present disclosure. The universal LLT lamp 800 comprises a housing having two ends; two lamp bases 660 and 760 having respective bi-pins 250 and 350 at each end of the housing; a first and a second input modules 600 and 700 respectively comprising shock protection switches 610 and 710 and filament circuits 616 and 617; two actuation mechanisms 640 and 740 of shock protection switches 610 and 710 respectively in the two lamp bases 660 and 760; a bridge rectifier 603 comprising four diodes 611, 612, 613, and 614 interconnected at four input/output ports 402, 404, 503, and 504; an all-in-one LED driving circuit 100 having two inputs connected to the input/outputs 503 and 504; and LED arrays 214 on an LED PCB. Each of the filament circuits 616 and 617, comprising at least a resistor has three ports in which the first and the second ports connect to the two pins of the respective bi-pins 250 and 350 through the shock protection switches 610 and 710 in the on-state, and the third port connects to the bridge rectifier 603 via the input/output ports 402 and 404. The bridge rectifier 603 thus can receive power from the bi-pins 250 and 350 connected to the AC mains or the electronic ballast in a double-ended wiring lamp fixture.

The protection switch 610 in the first input module 600 at the lamp base 660 is of double-pole single-throw type, which consists of one actuation mechanism 640 and two sets of electrical contacts. In the first set, the first electrical contact connects to the upper pin of the bi-pin 250 at an electrical contact 401 whereas the second electrical contact connects to the first port of the first filament circuit 616. In the second set, the first electrical contact connects to the lower pin of the bi-pin 250 at an electrical contact 403 whereas the second electrical contact connects to the second port of the first filament circuit 616. Similarly, the shock protection switch 710 in the second input module 600 at the other lamp base 760 comprises one actuation mechanism 740 and two sets of electrical contacts with electrical contacts 405 and 407 respectively connecting to the two pins of the bi-pin 350 and the first and second ports of the second filament circuit 617.

The shock protection switches 610 and 710 are normally "off" when the lamp is not installed in the fixture. When actuated (pressed in, twisted on, etc.), the actuation mechanisms 640 and 740 respectively actuate the protection switches 610 and 710 and turn on the connection between the AC mains or the electronic ballast and the bridge rectifier 603. When someone tries to install the universal LLT lamp 800 that can be operated with the AC mains or an electronic ballast in a double-ended fixture wired as an AC mains-ready or electronic ballast compatible configurations as in FIG. 6, she or he needs to first insert, for example, the lamp base 660 to the fixture lamp holder 810. The actuation mechanism 640 is actuated to turn on both sets of electrical contacts on the shock protection switch 610. The first filament circuit 616 provides an electrical path to connect the shock protection switch 610 to the bridge rectifier 603 so that the bridge rectifier 603 can automatically sense whether a voltage exists between the ports 402 and 404. Because the lamp base 760 has not yet been installed into the fixture lamp holder 820, no power is delivered to the all-in-one LED driving circuit 100 and the LED arrays 214. However, an electric current may flow into the all-in-one LED driving circuit 100 and return to the port 404, continuously flowing into the second filament circuit 617. At this time, the actuation mechanism 740 is not actuated because the lamp base 760 has not yet been inserted into the lamp holder 820. So the shock protection switch 710 remains "off", disconnecting any electric current flow to the exposed bi-pin 350, and thus no leakage current can possibly flow out—no electric shock hazard. When the person who does the installation further inserts the lamp base 760 into the lamp holder 820, the actuation mechanism 740 is actuated, which turns on the shock protection switch 710, thus connecting the bi-pin 350 to the second filament circuit 617. The AC voltage from the AC mains or an electronic ballast thus appears at the ports 402 and 404 of the bridge rectifier 603, and the power is delivered to the all-in-one LED driving circuit 100 and the LED arrays 214.

In FIG. 6, although the universal LLT lamp is shown to be installed in a linear double-ended fixture in which two sets of the sockets are in the opposite ends of the LLT lamp, the universal LLT lamp may be of U shape and may not have the shock protection switches. The U-shape LLT lamp may be installed in a conventional U-Bend fluorescent tube fixture to replace a U-Bend fluorescent light bulb to operate with either the AC mains or an electronic ballast. Also although the universal LLT lamp is shown to have two filament circuits to connect between the shock protection switches and the bridge rectifier, the input modules 600 and 700 in the universal LLT lamp may not have filament circuits.

Figure 7:
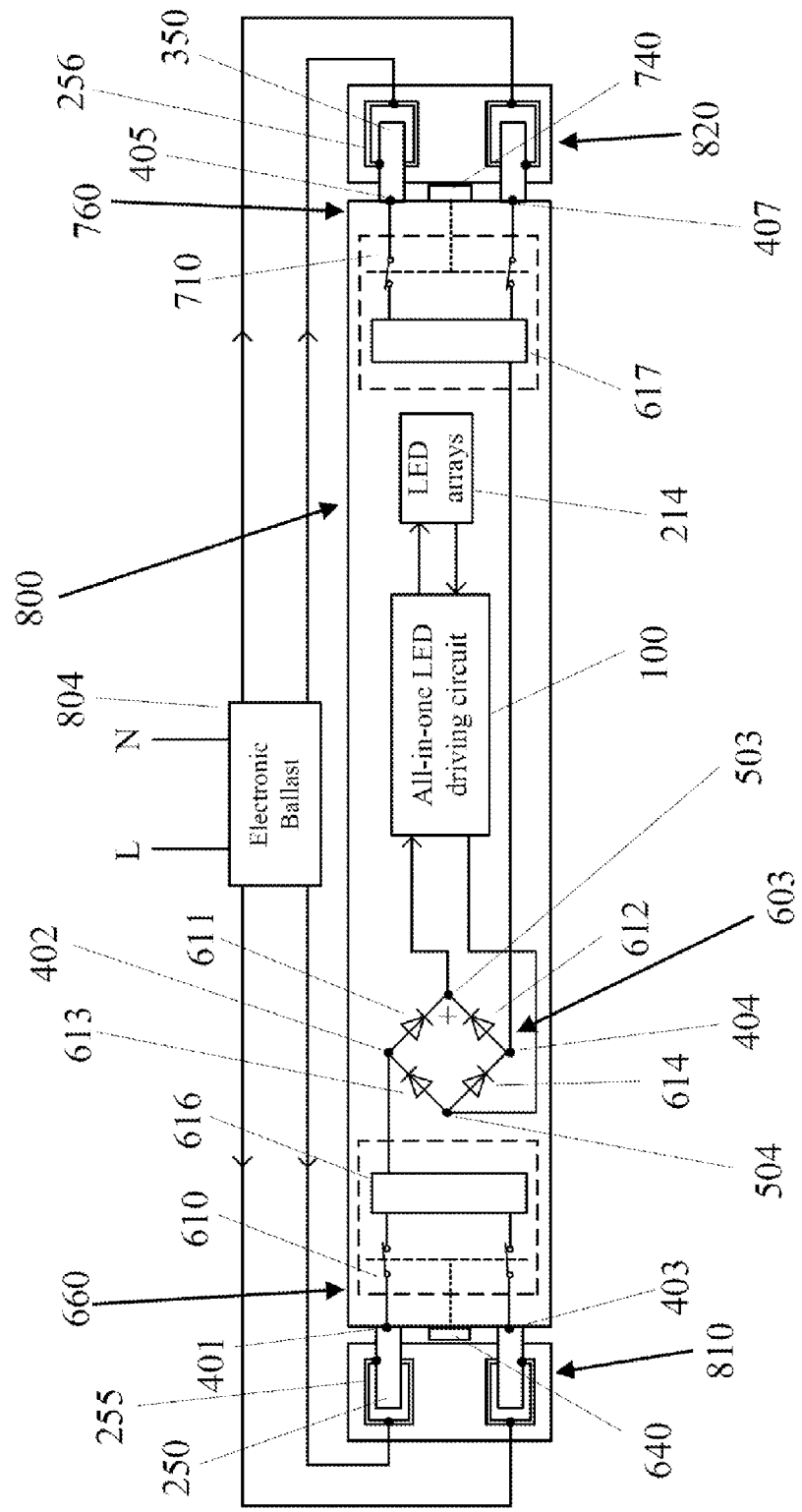
FIG. 7 is a block diagram of a universal LLT lamp operable with a rapid-start electronic ballast according to the present disclosure.

FIG. 7 is a block diagram of a universal LLT lamp operable with a rapid-start electronic ballast according to the present disclosure. In general, a rapid-start electronic ballast has two pairs of wires connecting to a fluorescent fixture to operate a fluorescent tube. Each pair has two wires with the same color. In FIG. 7, the first and the second pairs of wires from the rapid-start electronic ballast 804 respectively connect to two electrical sockets 255 and 256 in the fixture lamp holders 810 and 820. The universal LLT lamp is same as the one in FIG. 6, with the filament circuits 616 and 617 in the respective input modules 600 and 700 on each end of the universal LLT lamp.

The two filament circuits 616 and 617 are used to mimic two filaments in a fluorescent tube during a start up process to properly operate the fluorescent tube. In some rapid-start electronic ballasts, an internal circuit will check to see if such filaments exist to further proceed with a high voltage across the two pairs of the wires to operate a LLT lamp. Each filament comprises at least one resistor with a resistance so small that its voltage drop and power consumption can be neglected. As in FIG. 6, an electric current may leak out to an exposed bi-pin through the all-in-one LED driving circuit 100 when a high voltage from the rapid-start electronic ballast 804 applies to the bi-pin already installed in the fixture, creating an electric shock hazard if no shock protection switches are in place.

The shock protection switches in embodiments may be of a contact type, each of which may be a snap switch, a push-button switch, a micro switch, a twist-on switch, or a rotary switch. The shock protection switches may be of a non-contact type, each of which may be electro-mechanical, electromagnetic, optical, electro-optic, fiber-optic, infrared, or wireless based. The shock protection switches may be of a sensing type having a proximity control with a sensing range up to approximately 8 mm.

Although the above embodiments use a linear LED tube lamp as an example, in fact, all the conventional fluorescent light bulbs used today can be replaced with a universal LED-based lamps adopting the all-in-one LED driving circuit, featuring as AC main-operable and electronic ballast compatible.

Whereas preferred embodiments of the present disclosure have been shown and described, it will be realized that alterations, modifications, and improvements may be made thereto without departing from the scope of the following claims. Another all-in-one LED driving circuit with a voltage feedback module in an LED-based lamp using various kinds of combinations to accomplish the same or different objectives could be easily adapted for use from the present disclosure. Accordingly, the foregoing descriptions and attached drawings are by way of example only, and are not intended to be limiting.

What is claimed is:

1. A linear light-emitting diode (LED) tube lamp, comprising:
    a housing having two ends;
    a light-emitting diode printed circuit board (LED PCB), the LED PCB comprising LED arrays disposed thereon;
    two lamp bases respectively connected to the two ends of the housing, each lamp base comprising a bi-pin each with two pins protruding outwards, each lamp base further comprising an input module comprising a shock protection switch;
    a bridge rectifier configured to convert an alternating current (AC) input voltage from an electronic ballast or AC mains into a direct current (DC) voltage; and
    an LED driving circuit configured to receive the DC voltage, the LED driving circuit comprising an input filter, a power factor correction (PFC) and control device, a switch controlled by the PFC and control device, a current sensing resistor, a diode, an inductor with its current charging and discharging controlled by the switch, a resistor, an output capacitor in parallel with the resistor connected to the inductor to build up an output voltage and to power the LED arrays, and a voltage feedback module used to draw partial power from the output voltage to sustain an operation of the PFC and control device;
    wherein, responsive to detecting zero current in the inductor within an AC cycle of the input voltage, the PFC and control device generates a zero current detection signal to control the switch on and off with a constant on-time and a varied off-time;
    wherein, for each lamp base, when the respective shock protection switch is off, power from the AC mains or the electronic ballast is decoupled from the linear LED tube lamp; and
    wherein, for each lamp base, when the bi-pin is installed in a lamp socket, the respective shock protection switch is actuated to couple power from the AC mains or the electronic ballast to the linear LED tube lamp.

2. The linear LED tube lamp of claim 1, wherein the voltage feedback module comprises a diode.

3. The linear LED tube lamp of claim 1, wherein the switch in the LED driving circuit operates at a switching frequency no less than 55 KHz.

4. The linear LED tube lamp of claim 1, wherein the inductor in the LED driving circuit is of an autotransformer type.

5. The linear LED tube lamp of claim 1, wherein the inductor in the LED driving circuit is of a transformer type.

6. The linear LED tube lamp of claim 1, wherein the PFC and control device operates in a range approximately between 11 V and 35 VDC.

7. The linear LED tube lamp of claim 1, wherein each of the shock protection switches is of a contact type.

8. The linear LED tube lamp of claim 7, wherein each of the shock protection switches is a snap switch, a push-button switch, a micro switch, a twist-on switch, or a rotary switch.

9. The linear LED tube lamp of claim 1, wherein each of the shock protection switches is of a non-contact type.

10. The linear LED tube lamp of claim 9, wherein each of the shock protection switches is electro-mechanical, electromagnetic, optical, electro-optic, fiber-optic, infrared, or wireless based.

11. The linear LED tube lamp of claim 10, wherein each of the shock protection switches is of a sensing type having a proximity control with a sensing range up to approximately 8 mm.

12. The linear LED tube lamp of claim 1, wherein each of the input modules further comprises a filament circuit.

13. A linear light-emitting diode (LED) tube lamp, comprising:
    a housing having two ends;
    a light-emitting diode printed circuit board (LED PCB), the LED PCB comprising LED arrays disposed thereon;
    two lamp bases respectively connected to the two ends of the housing, each lamp base comprising a bi-pin each with two pins protruding outwards, each lamp base further comprising an input module;
    a bridge rectifier connected to the bi-pins, the bridge rectifier configured to convert an alternating current (AC) input voltage from an electronic ballast or AC mains into a direct current (DC) voltage; and
    an LED driving circuit configured to receive the DC voltage from the bridge rectifier, the LED driving circuit comprising an input filter, a power factor correction (PFC) and control device, a switch controlled by the PFC and control device, a current sensing resistor, a diode, an inductor with its current charging and discharging controlled by the switch, a resistor, an output capacitor in parallel with the resistor connected to the inductor to build up an output voltage and to power the LED arrays, and a voltage feedback module used to draw partial power from the output voltage to sustain an operation of the PFC and control device;

wherein, responsive to detecting zero current in the inductor within an AC cycle of the input voltage, the PFC and control device generates a zero current detection signal to control the switch on and off with a constant on-time and a varied off-time.

14. The linear LED tube lamp of claim 13, wherein the voltage feedback module comprises a diode.

15. The linear LED tube lamp of claim 13, wherein the switch in the LED driving circuit operates at a switching frequency no less than 55 KHz.

16. The linear LED tube lamp of claim 13, wherein the inductor in the LED driving circuit is of an autotransformer type.

17. The linear LED tube lamp of claim 13, wherein the inductor in the LED driving circuit is of a transformer type.

18. The linear LED tube lamp of claim 13, wherein the PFC and control device operates in a range approximately between 11 V and 35 VDC.

19. The linear LED tube lamp of claim 13, wherein each of the input modules further comprises a filament circuit.

20. The linear LED tube lamp of claim 13, wherein the linear LED tube lamp is of a U-bend shape.

\* \* \* \* \*